Patented Mar. 29, 1932

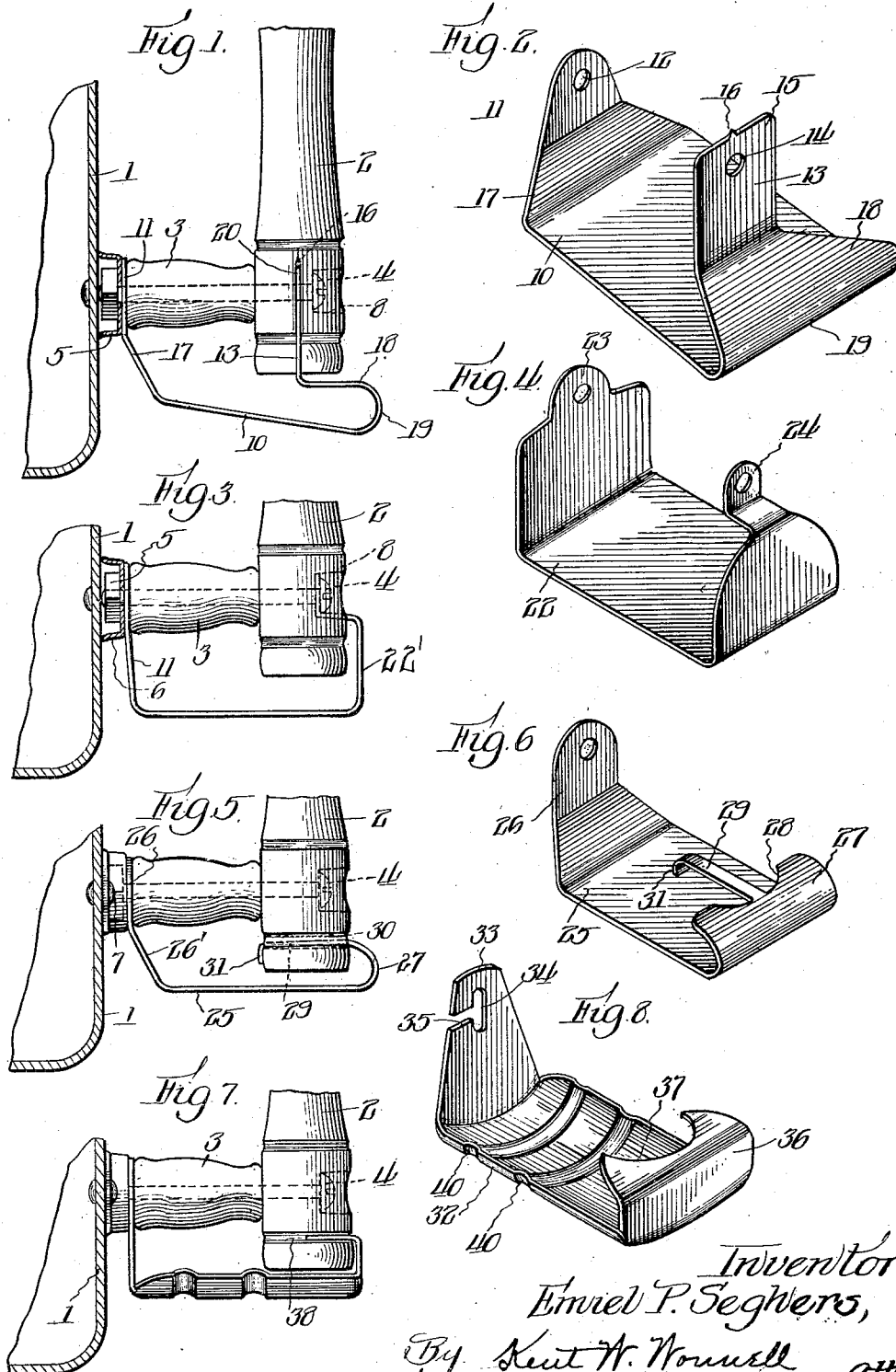

1,851,136

UNITED STATES PATENT OFFICE

EMIEL P. SEGHERS, OF CHICAGO, ILLINOIS

HANDLE PROTECTOR

Application filed April 25, 1928. Serial No. 272,646.

This invention relates in general to a handle protector and has more particular reference to a protector of this kind for a percolator and like utensils.

One of the principal objects of the invention is in the provision of an improved guard for the lower end of a handle having a support or attachment at both ends of the guard for holding it firmly in place.

A further object of the invention is to provide an improved guard which is so connected at both ends that it will not obstruct the handle in its ordinary use.

Other objects will appear hereinafter, the drawings illustrating several preferred embodiments of the invention. In the drawings, Figure 1 is a side elevation of one form of protector applied to the handle of a percolator;

Figure 2 is a perspective of the protector shown in Figure 1;

Figure 3 is a side elevation of a modification applied to a handle;

Figure 4 is a perspective of the protector shown in Figure 3;

Figure 5 is a side elevation of another modified form of protector;

Figure 6 is a perspective of the protector shown by Figure 5; and

Figure 7 is a side elevation, and Figure 8 is a perspective of still another modification of the protector.

Coffee percolators and like utensils are usually provided with wooden handles held in place by removable screws and when used on gas ranges the lower portion of the handle is very likely to become burned and after comparatively short use must be renewed or repaired. The present invention provides a heat deflector as well as a guard which protects the lower end of the handle, deflecting and dissipating the heat.

Some of the guards heretofore used have been connected only at one end, usually close to the utensil itself so that the outer end is free or unsupported. Such guards are easily bent, broken and deflected and must be repaired or replaced in order to afford the proper protection. The present invention overcomes this objection by providing a guard which extends entirely below the handle and the arm connecting it to the utensil, the guard being secured at one end adjacent the utensil and at the other end to the lower portion of the handle, this end being so disposed that it does not interfere with the full length of the handle.

In the drawings a portion of a percolator 1 is shown in section having a handle 2 connected at its upper and lower ends by laterally extending wooden arms 3 by means of screws 4 which extend longitudinally through the arms and transversely through the ends of the handle 2. The inner end of each screw 4 engages with a nut 5 disposed in a socket 6 attached to the utensil 1 by rivets 7. The outer end or head of this screw 4 may be seated in a recess 8 in the handle. The structure thus described is common to all of the utensils illustrated in this exemplification of the invention.

A protector 10 as illustrated in Figures 1 and 2 is formed of sheet metal such as copper or aluminum and has a rounded attachment tab 11 at one end with a perforation 12 therein. At the other end of the protector is an attachment tab 13 having a perforation 14 therein and with a straight extremity 15 which may have a small angular projection 16 intermediate its sides. Connecting the tab 11 with the main guard portion of the protector is an inclined portion 17, and connecting the other tab 13 is a reversely bent portion 18 with a rounded end 19 adapted to extend below and slightly beyond the lower end of a handle 2.

In applying this protector to a handle 2 the lower end of the handle is provided with a slot 20 extending transversely to the opening for the screw 4, and in applying the protector to the lower end of the handle the screw 4 is removed, the tab 13 is inserted in the slot 20 until the perforation 14 thereof registers with the screw opening and the screw 4 is then inserted through the handle 2, the tab 13, and the arm 3, and then through the perforation 12 of the tab 11 into its nut 5 where it is secured in place. When the screw is tightened, the protector 10 will be held below the handle and prevented from lateral displacement by the engagement of the upper straight edge 15 of the tab 13 with the inner edge of the slot 20. If an angular projection 16 is provided on the tab 13, it may be forced in place in the material of the handle and serves additionally to hold the protector in proper position.

In this form of protector the reversely bent portion 18 extends below the lower end of the handle so that the entire handle is unobstructed for use and the rounded end 19 not only spaces the main guard portion from this end of the handle but also causes it to be inclined upwardly, thereby deflecting the heat away from the handle and toward the utensil itself. Thus, even though the main guard portion does become pretty hot the rounded portion 19 and the bent portion 18 are spaced sufficiently therefrom so that even if the hand of a user on the handle does come in contact with the bent portion 18 it will not be burned.

Referring now more particularly to the form shown by Figures 3 and 4, a protector 22 has perforated tabs 23 and 24 for engaging the opposite ends of the screw 4, but one of the tabs 24 is reduced in size so that it may be inserted from the outer end into the recess 8 directly in engagement with the under side of the head of the screw which thereby holds the protector against lateral movement, and by engagement with the other end retains it securely in place at both ends. In this form the attaching portion nearest the percolator is only slightly inclined and the reversely bent portion 22' is angularly bent instead of rounded.

In the form shown by Figures 5 and 6 a protector 25 has a perforated tab 26 for engagement with the utensil end of the screw 4 and the other end of the protector has an upwardly rounded reversely bent portion 27 with a curved inner edge 28 to conform to the curvature of the handle 2 and a reduced tongue 29 extending from the curved edge and adapted to be inserted through a hole 30 in the end of the handle and to have its extremity 31 bent over against the handle at the inner end of the hole 30. This form has an inclined portion 26' between the inner attaching tab and the lower guard portion.

The so-called reversely bent portion in each of these forms adapts the guard portion to extend below and protect the lower end of the handle from the burner and the inclined portion may be more or less inclined in making the guard fit the handle to which the protector is applied.

In the modification shown by Figures 7 and 8, the protector 32 has a tab 33 with a slot 34 therein having a side opening 35 adapted to be engaged with the inner end of the screw 4 without entirely removing the screw from its engagement with the utensil. The outer end of this protector has an upward bend 36 and an inwardly turned edge with a semicircular recess 37 adapted to engage and fit partially around the lower end of a handle 2, the recessed edge preferably fitting in a circumferential groove 38 at the lower end of the handle. The engagement of the outer portion of this protector with the groove of the handle prevents a tilting or disengaging movement of the protector.

It will be observed that the guard shown in Figures 7 and 8 is provided with strengthening and deflecting grooves 40, and it is contemplated that the other structures illustrated may also be provided with transverse or longitudinal strengthening grooves and ridges which strengthen the material and make it more rigid.

In these protectors it will be observed that both extremities are supported, thereby preventing them from longitudinal disengagement and the outer extremity engages the handle in a way to prevent a lateral tilting displacement.

While I have illustrated preferred forms of my invention, it is obvious that other changes may be made without departing from the spirit or scope of the invention.

I claim:

1. A handle protector of the class described comprising a sheet metal strip having a perforated tab at one end adapted to be engaged by handle fastener close to a utensil, a guard portion to extend outwardly below and beyond a handle and bent reversely with a reduced tab at the other end to engage the outer end of the same fastener to which the said perforated tab is attachable.

2. A percolator handle protector of thin metal having end attaching tabs, an intermediate inclined heat deflecting guard for the lower end of a handle, and a reversely bent portion between the guard and the attachment tab at that end.

3. A handle protector having end attaching tabs for engagement by a single fastening device at one end of a handle, an intermediate guard portion, and a squared abutment edge at the end of one tab, this abutment edge being adapted to engage a corresponding abutment in the slot of a handle for holding the protector from tilting and swinging when the tabs are engaged.

4. A handle protector according to claim 3 in which there is an angular projection from the abutment edge adapted to further engage in the slot of a handle to which the protector is attached for holding it in position.

5. A sheet metal handle protector having spaced end tabs with perforations in alignment to receive a single attachment screw, an intermediate heat deflecting guard portion inclined to the tabs, a reversely bent portion joining one tab to the guard portion for spacing the latter below the handle.

6. A sheet metal handle protector having an intermediate heat deflecting guard portion and reduced perforated end tabs, one with a round end and the other squared at the end, the squared end being insertable in a slot at the lower end of a handle, the guard portion being connected to this tab by a reversely bent portion which causes it to underlie the lower end of a handle, and the other end of the guard portion being connected to the other tab by an inclined deflecting portion.

7. A handle for a vessel having a main grip and a spacer to hold the grip from the vessel, fastening means comprising a screw extending transversely through the main grip portion and longitudinally through the spacer for attaching the handle to the vessel, and a guard having perforated ends through which the screw extends, one end being inserted between the spacer and the vessel, and the other end engaging the outer end of the screw, the guard having an intermediate portion forming a heat deflector which extends below the lower end of the main grip and the spacer.

8. The combination of a handle for percolators and the like having a main portion and a spacer at right angles thereto, and a single screw for attaching these portions together and to the lower part of a utensil, and a heat deflector comprising a metal strip with perforated extremities adapted to be engaged by opposite ends of the fastening screw, the outer end of the strip also engaging the handle grip for preventing it from turning.

9. The combination with a handle and a spacing member at right angles thereto, of a single fastening screw insertable through the handle and spacer for securing them to a vessel, the lower end of the handle having a slit extending across the opening for the screw, and a deflector of metal having perforated ends to engage the screw, one of the ends being disposed at the inner end of the spacer, and the other end of the deflector being inserted in the slit in the handle and having a screw inserted therethrough, thus holding both ends of the deflector rigidly in position with respect to the handle and its spacer.

10. A percolator handle protector of thin metal having end attaching tabs, an intermediate heat deflecting guard for the lower end of a handle, and a reversely bent portion between the guard and the attachment tab at that end, one of the tab ends being recessed to engage a positioning groove in a handle to which it is attached.

11. A percolator handle protector of thin metal having end attaching tabs, an intermediate heat deflecting guard for the lower end of a handle, and a reversely bent portion between the guard and the attachment tab at that end, one of the tabs comprising a straight portion for engagement in a positioning slot in a handle to which it is attached.

12. A percolator handle protector of thin metal having end attaching tabs, an intermediate heat deflecting guard for the lower end of a handle, and a reversely bent portion between the guard and the attachment tab at that end, one of the attachment tabs being reduced in width to engage a slot and having adjacent recesses to engage a groove for positioning this end in a handle to which the protector is attached.

EMIEL P. SEGHERS.